July 2, 1946.  G. M. BOUMPHREY  2,403,209
ARGRICULTURAL IMPLEMENT
Filed Aug. 18, 1944
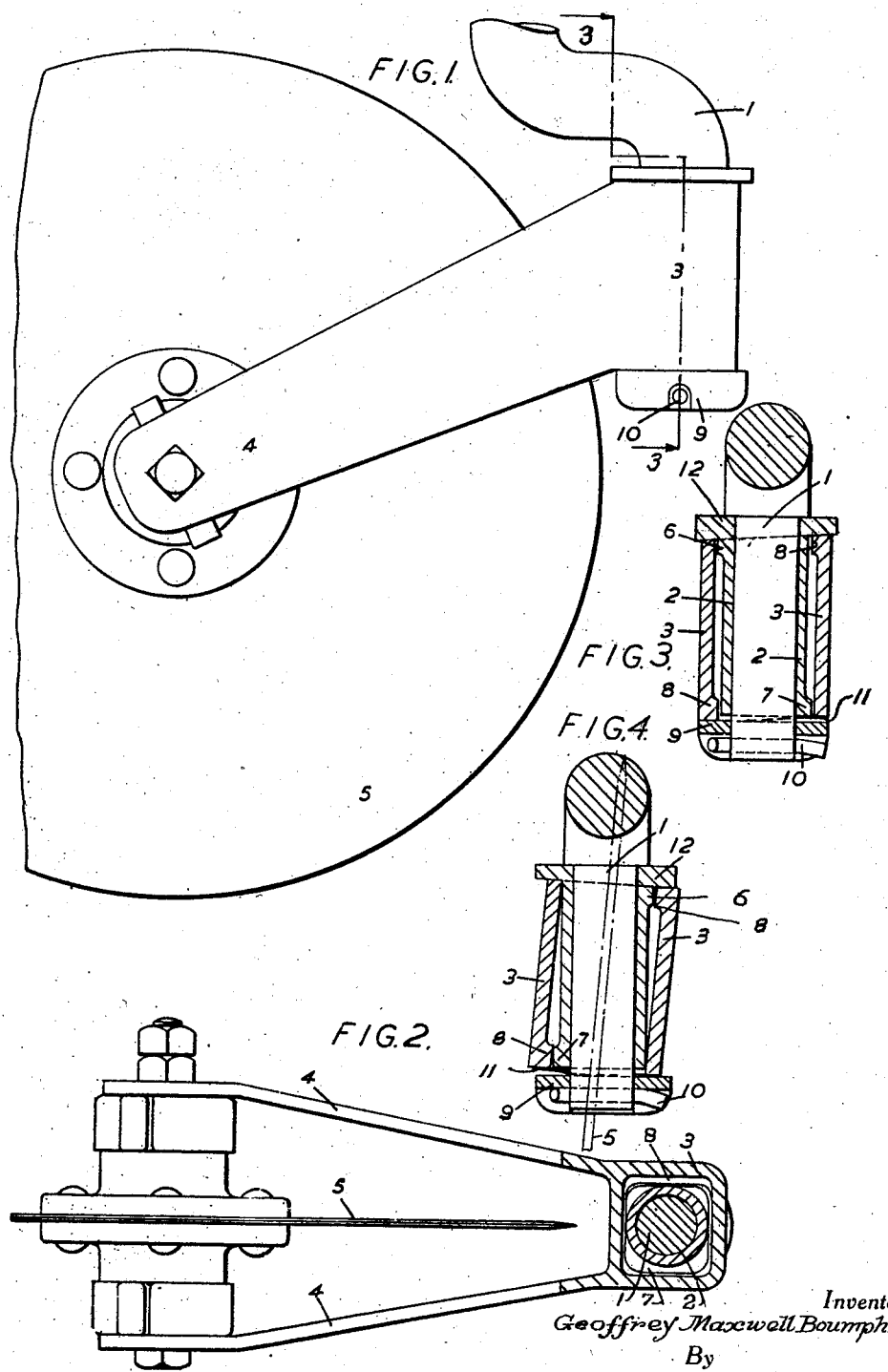
Inventor
Geoffrey Maxwell Boumphrey
By
Munn, Liddy & Glaccum
Attorneys Patented July 2, 1946

2,403,209

UNITED STATES PATENT OFFICE 2,403,209

AGRICULTURAL IMPLEMENT

Geoffrey Maxwell Boumphrey, Pershore, England

Application August 18, 1944, Serial No. 549,981
In Great Britain August 26, 1943

4 Claims. (Cl. 97—209)

This invention relates to ploughs and other agricultural implements provided with disc coulters and is directed towards an improved construction of support for coulter discs.

When ploughing, it is in certain circumstances desirable to be able to set the disc coulter out of the vertical plane to a greater or less degree in order to undercut the side of the furrow.

This is usually effected by supporting the coulter disc from one side only and by breaking the supporting member in some position intermediate between the vertical stem on which it is pivotally mounted and the centre of the disc; at the point where it is broken some means of adjustment is provided such as serrated surfaces which may be rotated in relation to each other and rigidly fixed by a nut and bolt or some such device in the position desired. The coulter supported from one side is necessarily less robust than a coulter supported in a forked bracket.

The object of the present invention is to provide means whereby the coulter disc is supported on each side by a fork in combination with means whereby this fork can be tilted relatively to the vertical stem on which it is pivotally mounted, thus providing a tilting adjustment for the disc.

This is preferably effected by providing a sleeve between the fork and its supporting stem, this sleeve being so formed that its rotation to one or more alternative positions within the fork, also suitably formed for the purpose, imparts a tilting movement to the fork.

With this and other objects in view the invention consists in the improved combinations and constructions set out in the claims which follow.

One construction in accordance with the invention is illustrated in the accompanying drawing in which Fig. 1 is an elevation with the coulter disc in upright position, Fig. 2 is a corresponding plan view, partly in section, Fig. 3 is a section through the line 3—3 of Fig. 1, Fig. 4 is a corresponding section with parts adjusted to bring the coulter to inclined position.

Referring to the drawing the stem 1 of the coulter is fixed to a sleeve 2 which fits in the closed end 3 of the fork 4 in which the coulter disc 5 is carried.

The sleeve has external surfaces which are substantially square in plan.

The fork end is also substantially square in plan so that the fork and sleeve are locked against relative rotational movement.

The sleeve 2 has at the top left-hand side as seen in Fig. 3 a projecting portion 6 and a corresponding projecting portion 7 at the bottom right-hand side; while the fork has an inwardly projecting portion 8 on the top right-hand side and a corresponding projecting portion 8 at the bottom left-hand side.

If the coulter stem 1 is lifted with the cylinder 2 attached thereto and the cylinder 2 is turned through 180 degrees and then replaced the fork 3 will be moved from the position shown in Fig. 3 to that shown in Fig. 4 with consequent tilting of the coulter disc 5.

The fork is supported in the stem 1 by a collar 9 and split pin 10.

The bottom surface of the fork is shaped to leave a clearance 11 which permits the tilting movement to take place.

The top of the sleeve 2 has a flange 12 the lower surface of which is inclined to engage a similarly inclined top surface of the fork end 3.

I claim:

1. An agricultural implement having in combination a coulter stem, a sleeve carried on said stem, a fork carried on said sleeve, a coulter disc carried in said fork and means on the sleeve and fork whereby turning of said sleeve relatively to said fork causes tilting of said fork together with said disc.

2. An agricultural implement having in combination a coulter stem, a sleeve carried on said stem, a fork carried on said sleeve, a coulter disc carried in said fork and a flange on the upper end of said sleeve, and cooperative means on said sleeve and fork to permit relative tilting between said fork and said sleeve.

3. An agricultural implement having in combination a coulter stem, a sleeve carried on said stem, a fork carried on said sleeve, a coulter disc carried in said fork and a collar detachably secured to the lower end of said stem, and cooperative means on the sleeve and fork to permit relative tilting between said fork and said sleeve.

4. An agricultural implement having in combination a coulter stem, a sleeve carried on said stem, a fork carried on said sleeve, a coulter disc carried in said fork, a flange on the upper end of said sleeve, a collar detachably secured to the lower end of said stem, said flange and said collar being so shaped as to permit relative tilting between said fork and said sleeve, and cooperative means on said sleeve and fork to limit relative tilting between said fork and said sleeve.

GEOFFREY MAXWELL BOUMPHREY.